Dec. 24, 1957  C. BRAMMING  2,817,452
VACUUM BOTTLE
Filed July 9, 1952
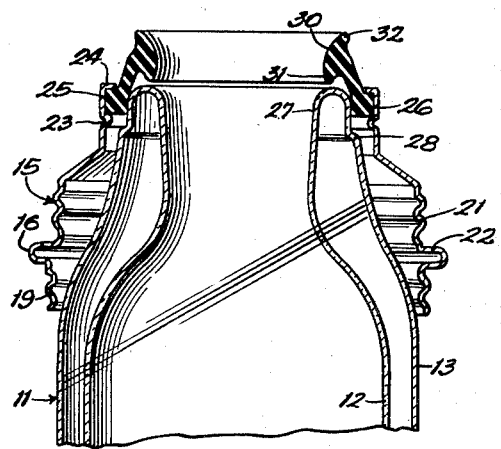
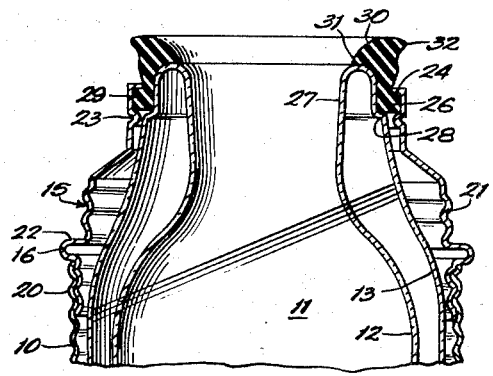
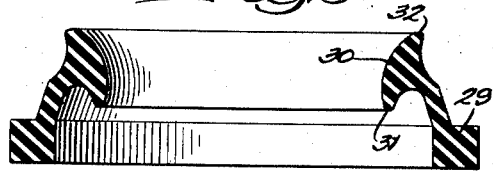
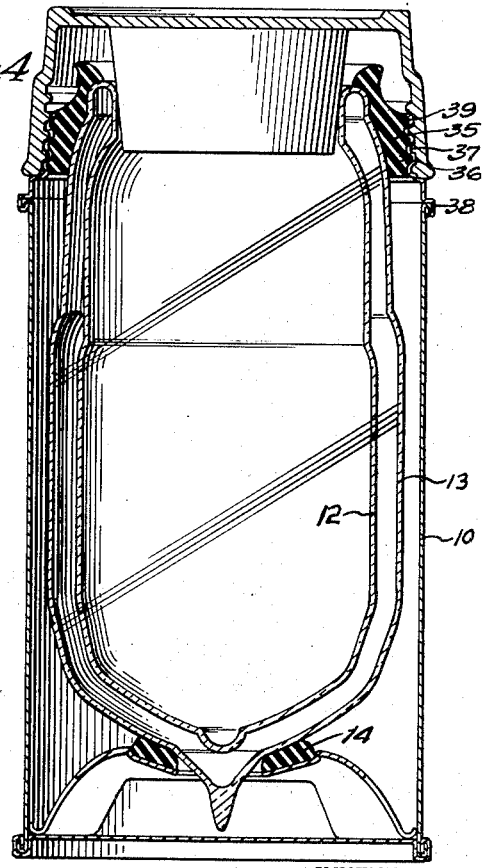
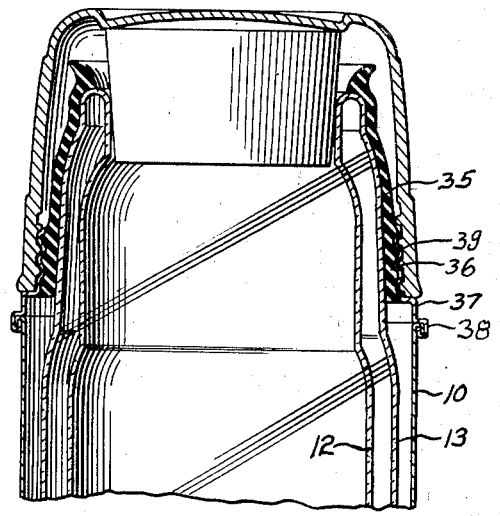
INVENTOR:
Carl Bramming,
BY
Dawson & Ooms,
ATTORNEYS.

United States Patent Office 2,817,452
Patented Dec. 24, 1957

2,817,452
VACUUM BOTTLE

Carl Bramming, Nashville, Tenn., assignor to Aladdin Industries, Incorporated, Nashville, Tenn., a corporation of Illinois Application July 9, 1952, Serial No. 297,892

2 Claims. (Cl. 215—13)

This invention relates to an improvement in the construction of a vacuum bottle, and more particularly to a means for establishing an improved sealing relation between the outer casing and the glass filler of a vacuum bottle assembly for protecting the glass filler against breakage and the like, and for providing a new and improved pouring lip for cleaner delivery of the content material from the glass filler.

An object of this invention is to provide an improvement in the assembly and construction of vacuum bottles of the type described.

More specifically, it is an object to provide a vacuum bottle in which means are provided for improving the sealing relation between the glass filler and the casing, which improves the pouring relation of the bottle and prevents seepage of content material into the space between the casing and glass filler, and which protects the end portion of the glass filler against breakage responsive to impact.

Another object is to provide a new and improved vacuum bottle which is simple in construction, easy in operation and economical in use.

A further object is to provide an improved gasket for vacuum bottles of the type described which not only prevents seepage of content material into the space between the casing and the filler but which provides an improved pouring lip to prevent drip of content material onto the outer wall of the casing in use and it is a related object to provide a unitary gasket and pouring lip of the type described capable of use in replacement of gaskets in vacuum bottles now in service.

These and other objects and advantages of this invention will hereinafter appear, and for purposes of illustration, but not of limitation, an embodiment of the invention is shown in the accompanying drawing in which—

Figure 1 is a fragmentary sectional elevational view showing the upper portion of a vacuum bottle assembly embodying features of this invention;

Figure 2 is a sectional elevational view corresponding to that of Figure 1 illustrating the position of parts when in their assembled relation;

Figure 3 is an enlarged sectional elevational view of the sealing gasket and pouring member of Figures 1 and 2;

Figure 4 is a fragmentary sectional elevational view showing a modification in a vacuum bottle embodying features of this invention; and Figure 5 is a sectional elevational view showing a further modification of this invention.

Invention herein resides generally in a vacuum bottle of the type having an outer casing 10 of metal, plastics or other rigid material molded to cylindrical shape or other geometrical contour. Positioned within the casing and in spaced apart relation therefrom is a glass filler 11 having an inner and outer blank, 12 and 13, respectively, joined in sealing relation with a vacuum existing therebetween to minimize heat transfer. The surfaces of the blanks are preferably silvered or coated with other highly reflective substance to minimize the transfer of heat in either direction. The filler usually rests on a rubber ring 14 positioned on a resilient bridge in the lower portion of the casing to minimize the transfer of shock from the casing to the glass filler.

In the modification shown in Figures 1–3, the assembled relation between the casing and filler and the support for the cup closure is provided by a substantially rigid collar 15 which may have a lower threaded end portion 19 for attachment to the threaded upper end 20 of the casing and a threaded intermediate end portion 21 for receiving the threaded end of a cup closure (not shown). Between the threaded sections 19 and 21, there is provided an outwardly extending rib 16 which provides a stop or seat for the engaged parts.

The cup receiving portion 21 is of smaller diameter than the screw threaded portion 19 whereby a shoulder 22 is formed upon which the end of the cup rests when in position of use. The upper end portion of the collar tapers inwardly and then extends vertically upwardly and is formed with an annularly inwardly extending rib 23 in advance of the inturned end 24 spaced therefrom to provide an annular groove 25 therebetween which functions as a seat for the sealing gasket 26.

The neck 27 of the glass filler 11 is formed with a slight taper in the outward direction for receiving a cork in sealing relation when inserted therein. In the outer blank 13, the lip portion is indented adjacent the rib 23 to provide a ledge 28 upon which the lower end portion of the gasket 26 rests when inserted in position of use between the collar and the glass filler.

The gasket comprises a rubber or other resilient member having an enlarged ring portion 29 in its lower end which seats within the groove 25 of the collar and abuts the outer wall of the glass filler to effect a sealing relation therebetween. The inner wall of the gasket is formed of curvilinear shape corresponding to that of the lip of the glass filler thereby substantially to embrace the lip substantially throughout its entire area and it is dimensioned to fit over the end portion of the lip so as to receive impacts and protect the lip against breakage.

In position of use, the upper end portion of the gasket embraces the lip and has a curvilinearly outwardly extending upper wall 30, the inner end portion 31 of which extends substantially as a continuation from the inner wall of the glass filler while the outer end portion 32 is sharply offset from the adjacent wall portion of the gasket to provide an annular pouring lip which substantially eliminates drip of the fluid content material down the side walls of the casing or collar.

In assembly, it is only necessary to seat the annular ring 29 of the gasket into the groove 25 of the collar and then threadably engage the collar with the threaded portion 20 of the casing. From this position, shown in Figure 1, the assembled relation, shown in Figure 2, may be effected merely by screwing the collar down into the casing whereby the gasket is displaced into position of use to embrace the outer lip portion of the glass filler and to seat upon the ledge 28 in effecting the desired sealing relation.

It will be evident from the description that the gasket functions not only to effect an improved sealing relation between the upper end of the glass filler and collar but that it provides an improved pouring lip for delivery of content material and it receives impacts without transfer to the filler thereby to protect the glass filler against breakage. To remove the glass filler for replacement or repair, it is only necessary to unscrew the collar from the casing.

In the modification illustrated in Figures 4 and 5 of the drawings, the necessity for a threaded portion to attach the collar to the casing and a separate threaded portion for receiving the clip member is avoided and the construction of the collar member is greatly simplified. As shown in Figure 4, instead of terminating in the flanged ring 29 which seats within the collar groove 25, the gasket is formed with a cylindrical skirt 35 which embraces the outer wall of the glass filler and terminates in an end portion 36 which is threaded in its outer wall.

The collar 37 may comprise a short metal band permanently fixed to the end of the casing as by crimping 38. The upper end portion of the collar is deformed into threads 39 adapted threadably to engage the gasket in contacting relation with its inner wall and to be threadably engaged by the cup member about its outer wall. The collar is of larger diameter than the glass filler thereby to enable removal of the filler upon disengagement between the threaded skirt of the gasket and the collar.

The modification shown in Figure 5 corresponds generally to the construction in Figure 4 except that the rubber gasket is considerably shorter and of greater cross section thereby to provide for a more resilient assembly.

It will be apparent that in each of the modifications the pouring lip on the end of the gasket provides for cleaner delivery of the liquid material from the interior of the container while also protecting the end portion thereof against breakage by impact. Generally the cork member adapted to plug the mouth of the glass filler is of a length to be engaged by the top wall of the cup which functions to hold the cork in position to effect a sealing relation.

It will be understood that other changes may be made in the details of construction, arrangement and operation without departing from the spirit of the invention, especially as defined in the following claims.

I claim:

1. A combination sealing gasket and pouring device for use in a vacuum bottle between an inner vacuum insulated receptacle with a rounded top edge and an outer protective jacket having an upper portion with an annular generally horizontal inturned flange closely encircling the receptacle slightly below the top edge thereof, said combination sealing gasket and pouring device comprising a soft, flexible, resilient ring having a lower end portion, an intermediate annular generally vertical body wall portion surmounting said lower end portion, and an upper end portion surmounting said body wall portion, said lower end portion of said ring having an outwardly projecting annular external flange thereon defining a substantially horizontal upwardly facing shoulder on said lower end portion for engaging the underside of the inturned flange on the jacket, said lower end portion of said ring having an internal generally cylindrical surface for engaging the outside of the receptacle at a level spaced below the top edge thereof, said upper end portion of said ring having an annular overhanging outwardly projecting pouring lip at the top end thereof, said upper end portion of said ring having an internal annular flange projecting inwardly and downwardly thereon and terminating in an annular downwardly hanging internal flexible sealing lip for sealing engagement with the top edge of the receptacle, said internal flange being substantially below the level of said outwardly projecting pouring lip, said upper end portion of said ring having a flaring internal surface extending upwardly and outwardly between said downwardly hanging sealing lip and said outwardly projecting pouring lip.

2. In a vacuum bottle, the combination comprising an inner vacuum insulated receptacle with a rounded top edge, an outer protective jacket around said receptacle and having an upper portion with an annular generally horizontal inturned flange thereon closely encircling said receptacle slightly below said top edge thereof, a combination sealing gasket and pouring device comprising a soft, flexible, resilient ring having a lower end portion, an intermediate annular generally vertical body wall portion surmounting said lower end portion, and an upper end portion surmounting said body wall portion, said lower end portion of said ring having an outwardly projecting annular external flange thereon defining a substantially horizontal upwardly facing shoulder thereon engaging the underside of said inturned flange on said jacket, said external flange on said ring having an external annular surface engaging the inside of said jacket immediately below said inturned flange thereon, said lower end portion of said ring having an internal generally cylindrical surface engaging the outside of said receptacle at a level spaced below said top edge thereof, said upper end portion of said ring having an annular overhanging outwardly projecting pouring lip at the top end thereof, said upper end portion of said ring having an internal annular flange projecting inwardly thereon and terminating in an annular internal flexible sealing lip in sealing engagement with said top edge of said receptacle and flexed upwardly by such engagement from a free state position with said sealing lip hanging downwardly, said internal flange being substantially below the level of said outwardly projecting pouring lip, said upper end portion of said ring having a flaring internal surface extending upwardly and outwardly between said sealing lip and said pouring lip.

References Cited in the file of this patent
UNITED STATES PATENTS

| | | |
|---|---|---|
| 302,268 | Lothrop | July 22, 1884 |
| 1,448,996 | Donath | Mar. 20, 1923 |
| 2,099,174 | Payson | Nov. 16, 1937 |
| 2,199,732 | Antonson | May 7, 1940 |
| 2,207,543 | Knapp | July 9, 1940 |
| 2,408,463 | Wright | Oct. 1, 1946 |

FOREIGN PATENTS

| | | |
|---|---|---|
| 239,287 | Great Britain | Sept. 7, 1925 |
| 682,122 | France | Feb. 10, 1930 |
| 142,846 | Switzerland | Dec. 16, 1930 |
| 498,661 | Great Britain | Jan. 11, 1939 |
| 499,303 | Great Britain | Jan. 19, 1939 |